United States Patent
Christiansen et al.

(10) Patent No.: US 12,244,185 B2
(45) Date of Patent: Mar. 4, 2025

(54) ELECTRIC CIRCUIT AND WIND TURBINE

(71) Applicant: Siemens Gamesa Renewable Energy A/S, Brande (DK)

(72) Inventors: Poul Christiansen, Them (DK); Anders Erbo R. Jensen, Vejle (DK); Aaron Jones, Billund (DK); Haritha Subramanian Kalyanaraman, Horsens (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 161 days.

(21) Appl. No.: 18/007,613

(22) PCT Filed: Jun. 1, 2021

(86) PCT No.: PCT/EP2021/064595
§ 371 (c)(1),
(2) Date: Dec. 1, 2022

(87) PCT Pub. No.: WO2021/249813
PCT Pub. Date: Dec. 16, 2021

(65) Prior Publication Data
US 2023/0231448 A1 Jul. 20, 2023

(30) Foreign Application Priority Data
Jun. 9, 2020 (EP) .................... 20178878

(51) Int. Cl.
*H02K 11/40* (2016.01)
*F03D 80/30* (2016.01)
(Continued)

(52) U.S. Cl.
CPC ............. *H02K 11/40* (2016.01); *F03D 80/30* (2016.05); *H01R 39/18* (2013.01); *H01R 39/64* (2013.01);
(Continued)

(58) Field of Classification Search
CPC ...... H02K 11/40; H02K 7/1838; F03D 80/30; F03D 9/25; H01R 39/18; H01R 39/64; H02G 13/40; Y10S 439/93; Y02E 10/72
(Continued)

(56) References Cited

U.S. PATENT DOCUMENTS

| 2009/0053062 A1 | 2/2009 | Arinaga et al. |
| 2014/0183864 A1* | 7/2014 | Hagedorn ............... F03D 80/70 290/44 |

(Continued)

FOREIGN PATENT DOCUMENTS

| DE | 102006058911 A1 * | 6/2008 | ............. H01R 39/08 |
| DE | 102007052525 A1 | 5/2009 | |

(Continued)

OTHER PUBLICATIONS

Faber Manfred; Title: Device for diverting earth currents, more particularly in wind turbines; Date: Dec. 31, 2014; entire specification and drawings (Year: 2014).*
(Continued)

*Primary Examiner* — Dharti H Patel
(74) *Attorney, Agent, or Firm* — Schmeiser, Olsen & Watts LLP

(57) ABSTRACT

An electric circuit providing a ground connection includes at least two brushes and a contact member, wherein each brush and the contact member form a sliding contact, wherein the contact member is connected to a ground potential by at least one of the sliding contacts, wherein at least two of the sliding contacts are connected to a current source adapted to provide a current through the sliding contacts.

12 Claims, 2 Drawing Sheets

Figure 1:
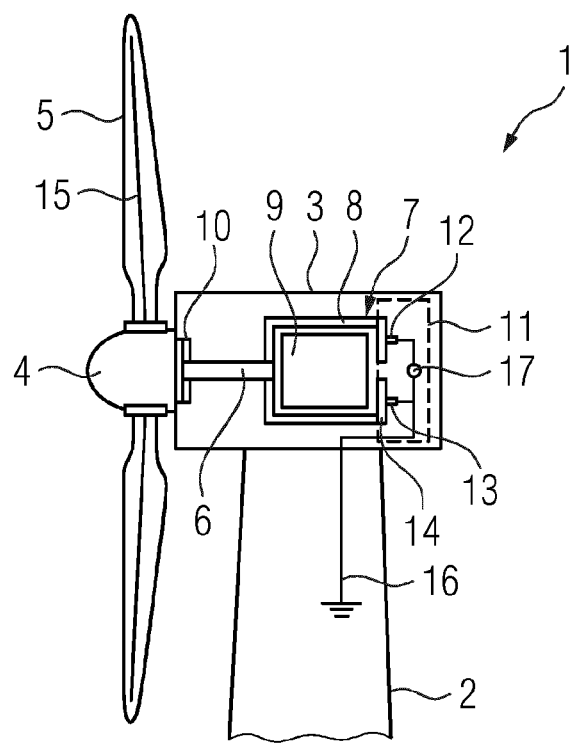

(51) Int. Cl.
    *H01R 39/18*    (2006.01)
    *H01R 39/64*    (2006.01)
    *H02G 13/00*    (2006.01)
    *H02K 7/18*     (2006.01)
(52) U.S. Cl.
    CPC .......... *H02G 13/40* (2013.01); *H02K 7/1838*
                    (2013.01); *Y10S 439/93* (2013.01)
(58) Field of Classification Search
    USPC .......................................................... 361/1
    See application file for complete search history.

(56)        References Cited

U.S. PATENT DOCUMENTS

2018/0080434  A1*   3/2018   Carr ..................... F03D 17/00
2022/0321039  A1*  10/2022   Mukherjee ............. F03D 17/00

FOREIGN PATENT DOCUMENTS

EP          1577551  A2 *   9/2005  ............. F03D 80/00
EP          3255276  A1    12/2017
WO     WO-2014207047  A1 *  12/2014  ............. H01R 39/20
WO     WO-2021170551  A1 *   9/2021  ............. H04B 5/22

OTHER PUBLICATIONS

PCT International Search Report and Written Opinion of International Searching Authority mailed Aug. 10, 2021 corresponding to PCT International Application No. PCT/EP2021/064595 filed Jun. 1, 2021.

* cited by examiner

ELECTRIC CIRCUIT AND WIND TURBINE

CROSS-REFERENCE TO RELATED APPLICATIONS

This application claims priority to PCT Application No. PCT/EP2021/064595, having a filing date of Jun. 1, 2021, which claims priority to EP Application No 20178878.3, having a filing date of Jun. 9, 2020, the entire contents both of which are hereby incorporated by reference.

FIELD OF TECHNOLOGY

The following relates to an electric circuit providing a ground connection, comprising at least two brushes and a contact member, wherein each brush and the contact member form a sliding contact, wherein the contact member is connected to a ground potential by at least one of the sliding contacts. Furthermore, the following relates to a wind turbine.

BACKGROUND

Sliding contacts may be used to ensure an electrical contact for instance between rotating structures and stationary structures. In wind turbines, such sliding contacts may be used to contact a rotating structure of the wind turbine and connect it via the sliding contact to a stationary part of the wind turbine. Sliding contacts, which are part of a ground connection and which are not conducting a current regularly during operation, tend to increase their impedance due to the built-up of an insulation film at the brush and/or at the surface of a corresponding counterpart, for instance a rotating member. Due to this increased contact resistance, electromagnetic noise may be emitted from the sliding contact, reducing for instance an electromagnetic compatibility of the electric circuit, or of a device comprising the electric circuit, respectively.

Patent publications US 2014/183864 A1, EP 3 255 276 A1, US 2009/053062 A1, and DE 10 2007 052525 A1 show wind turbine solutions with sliding electrical contacts, for example to avoid stray currents.

SUMMARY

An aspect relates to provide an electric circuit with improved sliding contacts, in particular with sliding contacts that exhibit an improved electromagnetic compatibility.

According to embodiments of the invention, this problem is solved by an electric circuit as initially described, wherein at least two of the sliding contacts are connected to a current source adapted to provide a current through the sliding contacts.

By the electric circuit, a ground connection is provided, wherein the ground connection involves at least one of the sliding contacts of the electric circuit. During operation of the electric circuit, or of an apparatus comprising the electric circuit, respectively, the ground connection is not or at least not permanently guiding a current. The electric circuit may be used for instance for potential equalization and/or in a lightning conductor path.

To clean the surfaces of the brushes and/or the contact member, at least two of the sliding contacts are connected to a current source, which provides a current through the sliding contacts. This allows for energizing the sliding contacts with a current provided from the current source, so that in particular the formation of an isolating film at the brushes and/or at the contact member can be prevented. The sliding currents energized by the current from the current source may exhibit advantageously clean surfaces and therefore a reduced contact impedance, which in particular improves the electromagnetic compatibility (EMC) of the electric circuit, or a device or apparatus comprising the electric circuit, respectively. Also the reduced contact impedance is advantageous since it improves a ground connection provided by the electric circuit and/or provides a better small signal impedance of the sliding contacts.

Providing a bias current by the current source is in particular advantageous for sliding contacts that do not conduct a current, or that do not frequently conduct a current, respectively, since an isolating film is formed at sliding contacts not conducting a current. The isolation film may cause a degraded bond between the surface of a brush and the surface of the contact member.

The contact member is at least partially electrically conductive, wherein by at least one of the brushes, the current provided from the current source is fed into the contact member. The current source may be connected also to the ground potential, so that a closed loop involving in particular all of the sliding contacts is obtained. The current source may be connected to one or more of the brushes, wherein one or more other brushes, in particular the remainder of the brushes, connect the contact member to a ground potential. This allows to provide a current through the sliding contacts of the electric circuit to obtain and/or to maintain cleaned surfaces of each of the sliding contacts. In other words, the current source provides a bias current energizing the otherwise not or at least not regularly energized sliding contacts leading to a self-cleaning of the brushes.

The contact member may be for instance a slip ring, which is rotatable relatively to the at least two brushes. A current source may be an alternating current (AC) current source or a direct current (DC) current source. It is also possible that the current source provides a superposition of an alternating current and the direct current.

The current source is adapted to provide a voltage at each brush that is equal to or larger than a breakdown voltage of an isolation film arising at the sliding contact in a state without current. By providing a voltage that exceeds the breakdown voltage of an isolation film, which may arise at the sliding contact, or at the brush and/or the contact member, respectively, at each brush of a sliding contact connected to the current source, also energizing of the sliding contacts is possible in a state, where already an isolation film is existing. Furthermore, the current provided by the current source can be used to remove the existing isolation film and to keep it clean and hence to improve the contact impedance of the sliding contact.

In an embodiment of the invention, the electric circuit comprises a measuring means for measuring a contact impedance of at least one of the sliding contacts, wherein the current source is adapted to provide a current in dependence of a measured contact impedance. This allows for providing a current by the current source adapted to an existing contact impedance of at least one of the sliding contacts. This allows for adjusting a current from the current source to the actual contact impedance, so that it is advantageously possible to save power during operation or the electric circuit, or the current source, respectively.

The measuring means may be for instance a sensor, in particular an ohmmeter, which measures the electrical impedance of one or more of the sliding contacts. The electric circuit may involve a control unit that is connected to both the measuring means and the current source, wherein a measured impedance of at least one of the sliding contacts is transmitted to the control unit. The control unit may then control the current source to provide a current depending on the actual contact impedance.

In an embodiment of the invention, the at least two brushes are electrically connected by the contact member and at least one capacitor. The capacitor may be used for instance to decouple the brushes from a direct current and/or to further improve the electromagnetic compatibility of the electric circuit.

In an embodiment of the invention, the brushes consist at least partly of carbon and/or copper (i.e., the brushes comprise carbon and/or copper), wherein the current source is adapted to provide a current density in at least one of the brushes of 1 A/cm$^2$-50 A/cm$^2$, in particular of 5 A/cm$^2$-20 A/cm$^2$. Such a current density in a brush inhibits the formation of an isolation film, in particular at the brush and/or the contact member and therefore at the sliding contact, respectively. In particular, the current density is provided in at least one of the brushes of the at least one sliding contact that provide the ground connection. It is possible that one or more sliding contacts, in particular a sliding contact that is connected to the current source, exhibit a higher current density in the respective brush, in particular in order to obtain a current density of 1 A/cm$^2$-50 A/cm$^2$, in particular of 5 A/cm$^2$-20 A/cm$^2$, in the further sliding contacts that provide the ground connection.

The electric circuit comprises a surge protection device. The surge protection device may be in particular connected in parallel to the current source. This may prevent a damaging of the current source, in particular when the ground connection of the electric circuit is used in a lightning conductor used for grounding the current created by a lightning strike. Furthermore, using the surge protection device, also the at least one sliding contact connected to the current source may be used for instance to ground the lightning current in the case that the surge protection device becomes conductive and closes a connection to a ground potential, in particular as a result to the lightning strike.

In an embodiment of the invention, the ground connection comprises at least one further brush not connected to the current source, wherein at least one of the brushes of the sliding contacts connected to the current source and the at least one further brush are movable relatively to the contact member at least partly on a mutual path. This allows for instance to provide a closed loop for the bias current by two or more brushes connected to both the contact member and the current source and to provide the ground connection, or additional ground connections, respectively, by the at least one sliding contact between the contact member and the at least one further brush.

A ground connection of the closed loop involving the current source may be obtained for instance using a surge protection device connecting the closed loop to the ground potential. The closed loop involving the at least two sliding contacts may also cause a reduced contact impedance of the sliding contact comprising the at least one further brush, which is not connected to the current source, but which moves relatively to the contact member at least partly on the same path as the brushes connected to the current source. By biasing the brushes, which are connected to the current source, with the current from the current source, also the contact impedance of the at least one sliding contact comprising the at least one further brush and the contact member can be advantageously reduced. Since at least on the surface of the contact member, which is in contact with the brushes and the at least one further brush, the formation of an isolation layer reducing the contact resistance may be prevented by the brushes connected to the current source. In particular, both the brushes connected to the current source and the at least one further brush may be moveable relatively to the contact member on a circular path, in particular when the contact member is a slip ring.

A wind turbine according to embodiments of the invention comprises an electric circuit according to embodiments of the invention. The electric circuit can be used with an advantage in a wind turbine, in particular for reducing electromagnetic noise emitted from the wind turbine. A wind turbine comprises several rotating parts, including the rotor blades, a hub bearing the rotor blades and a shaft connected to both the hub and a rotor of a generator of the wind turbine. At several positions, a provision of grounding connections using sliding contacts may be required, so that an electric circuit according to embodiments of the invention can be used with an advantage in the wind turbine. Advantageously, the contact impedance of these grounding connections may be reduced by the usage of the current source as previously described.

The reduction of the contact impedance of the sliding contacts of the electric circuit has the additional advantage that electromagnetic emissions created by the wind turbine can be reduced. Especially in a frequency range from 150 kHz-30 MHz, a significant reduction of the electromagnetic emissions can be obtained by using brushes connected to a current source in the respective grounding connections of the wind turbine. This helps to attenuate electromagnetic noise created in form of radiated and conducted emissions during the operation of the wind turbine. Additionally, also an immunity to external electromagnetic energy sources is improved.

The electric circuit provides a ground connection of a rotating part of a generator of the wind turbine. The generator may comprise for instance a rotor as rotating part, which rotates around a stator of the generator arranged inside the rotor. Since the rotor of the generator is connected to the shaft of the wind turbine as well as to the hub, an electrical contact between the rotor of the generator and one or more stationary parts of the wind turbine is necessary for grounding these components. By providing the ground connection by self-cleaning sliding contacts of an electric circuit, which can reduce the contact impedance by energizing the sliding contacts using a current source, the contact impedance of the sliding contacts comprising the brushes and a contact member attached to the rotating part of the generator can be kept low.

Additionally, a potential equalization between the rotating part of the generator and one or more stationary parts of the wind turbine can be improved by the reduced contact impedance of the sliding contacts. This may be in particular advantageous with regard to a bearing, which supports a rotating part of the wind turbine on a stationary part, in particular with regard to a main bearing supporting the rotatable shaft on a stationary housing. An improved contact resistance in a grounding connection providing a potential equalization between one or more rotating parts and the stationary parts prevents the appearance of undesired high voltages between the rotating parts and the stationary parts. These voltages may cause high noise voltages in the bearing, in particular over an oil film in a main bearing of the wind turbine. The reduction of these noise voltages decreases the risk of a flashover through the oil film and thereby increases the bearing lifetime.

In an embodiment of the invention, the electric circuit provides a ground connection of a lightning conductor of the wind turbine. The ground connection provided by the electric circuit may connect for instance a lightning conductor provided in one of the blades of the wind turbine to a stationary lightning conductor provided for instance inside the tower of the wind turbine. For connection of these lightning conductors, at least one connection between a rotatable part and a stationary part is required. This connection can be provided advantageously by the ground connection of the electric circuit.

In an embodiment, the contact member is a break disc of a rotatable part of the wind turbine. The break disc may be for instance attached to a rotor of the generator of the wind turbine allowing to break the rotor of the wind turbine during operation. The break disc may consist at least partly of a conductive material (i.e., the break disc may comprise conductive material), for instance steel or stainless steel, wherein the brushes of the electric circuit each form a sliding contact to the break disc.

In an embodiment, the current source is a common mode current induced by a generator of the wind turbine. Besides the main alternating current generated by the generator for power generation, also additional voltages or currents, in particular of a lower voltage, can be generated by the generator during operation of the wind turbine. An additionally induced common mode current can be directed to take the path of the brushes of the sliding contact by feeding it into a closed loop comprising the sliding contact, for instance using a transformer or the like. This has the advantage that no additional current source has to be implemented in the wind turbine for providing the bias current through the brushes. However, additionally or alternatively, also a current source, which is independent on the operation of the generator, can be used to facilitate in particular a control of the current source based on a measured actual contact impedance.

The advantages and details of the electric circuit according to embodiments of the invention apply correspondingly to a wind turbine according to embodiments of the invention and vice versa.

BRIEF DESCRIPTION

Figure 2:
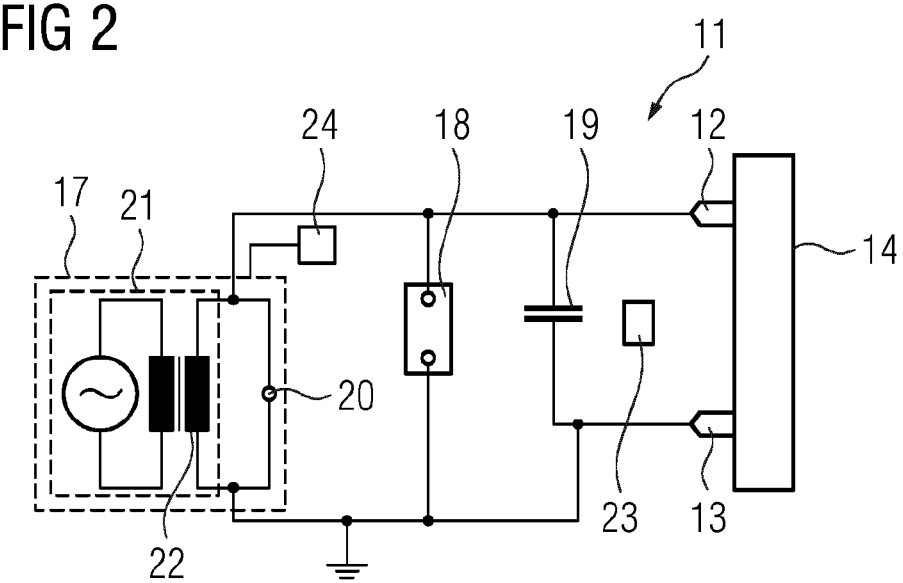
Figure 3:
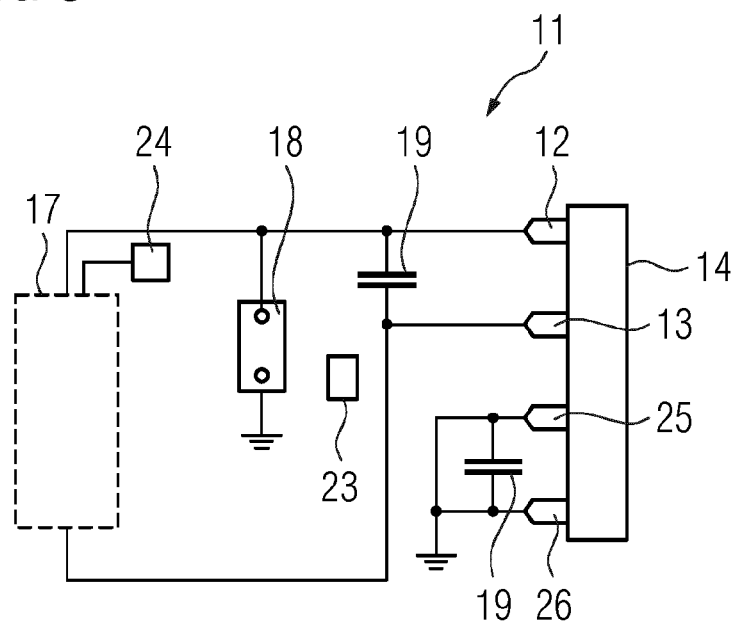

Some of the embodiments will be described in detail, with reference to the following figures, wherein like designations denote like members, wherein:

FIG. 1 an embodiment of a wind turbine according to the invention;

FIG. 2 a first embodiment of an electric circuit according to the invention; and FIG. 3 a second embodiment of an electric circuit according to the invention.

DETAILED DESCRIPTION

In FIG. 1, a wind turbine 1 according to embodiments of the invention is shown. The wind turbine 1 comprises a tower 2, a nacelle 3 and a hub 4, wherein the hub 4 bears a plurality of rotor blades 5. The hub 4 is connected to a rotatable shaft 6, which connects the hub 4 to a generator 7.

The generator 7 comprises a rotor 8 rotatable relatively to a stator 9 of the generator 7. The rotatable shaft 6 is supported on the stationary nacelle 3 by a main bearing 10 of the wind turbine 1.

The wind turbine 1 comprises an electric circuit 11, wherein the electric circuit 11 comprises two brushes 12, 13 each forming a sliding contact to a contact member 14 of the electric circuit 1. In this embodiment, the contact member 14 is a break disc of the wind turbine 1, which is attached to the rotor 8 of the generator 7 and which can be used to brake, or to stop, respectively, a rotation of the shaft 6. The rotating brake disc forms a slip ring creating a sliding contact with each of the brushes 12, 13.

The electric circuit 11 provides a grounding connection of the wind turbine 1 connecting one or more lightning conductors 15, which are arranged inside the rotor blades 5 and therefore in a rotating part of the wind turbine 1, to a down conductor 16 which is arranged inside the tower 2 of the wind turbine 1 and which is therefore stationary. The lightning conductor 15 is for instance electrically connected to the shaft 6 and to the rotor 7 of the generator, wherein a ground connection is provided by the electric circuit 11 by at least one of the sliding contacts between the brushes 12, 13 and the contact member 14 and the down conductor 16.

In normal operation of the wind turbine 1 neither the lightning conductors 15, 16 nor the sliding contacts between the brushes 12, 13 and the contact member 14 are permanently energized by a current. A current is conducted only in the rare circumstance of a lightning strike hitting the wind turbine 1. This may lead to the formation of an isolation film on the brushes 12, 13 and/or the contact member 14, which increases an electrical impedance of the connection between the brushes 12, 13 and the contact member 14, or of the sliding contacts, respectively, and thereby created a degenerated bond of the sliding contact.

The amount of electromagnetic emissions generated during the operation of the wind turbine 1 may depend, besides other effects, also on the electrical impedance of each of the sliding contacts between the brushes 12 or 13, respectively, and the contact member 14. To decrease the amount of electromagnetic emissions by reducing the contact resistance of the sliding contacts between the brushes 12, 13 and the contact member 14, the electric circuit 11 comprises a current source 17 that is connected to the sliding contacts provided by brushes 12, 13 and the contact member 14.

By the current source 17, a bias current is generated which circulates through the brushes 12, 13 and the contact member 14. The contact member 14 is at least partly electrically conductive and connects the sliding contacts of the brush 12 electrically to the sliding contact of the brush 13. As a result, a closed current loop is created which can be fed by the current from the current source 17, wherein the current flows through the sliding contacts between the brushes 12, or 13, respectively, and the contact member 14. By the current energizing the sliding connections, an existing isolation layer can be removed and/or the formation of a new isolation layer can be prevented advantageously.

In FIG. 2, a first embodiment of an electric circuit 11 is shown. In addition to the previously mentioned components, the electric circuit 11 also comprises a surge protection device 18 and a capacitor 19. By the surge protection device 18, also the sliding contact between the brush 12 and the contact member 14 is connected to a ground potential if a high voltage occurs in the electrical circuit, for instance in the event of an lightning strike into one of the lightning conductors 5. The capacitor 19 is connected in parallel to the current source 17 and is used for decoupling the brushes 12 and 13.

The current source 17 may comprise a direct current (DC) current source 20 and/or an alternating current (AC) current source 21. It is possible that the alternating current source 21 comprises a transformer 22, which allows for instance to use an alternating current created by the generator 7 as current source for the electric circuit 11. It is possible that for instance a common mode current induced by the operation of the generator 7, in particular in addition to an alternating current produced by the generator 7 for power generation, is used as current source 17 for the electric circuit 11, for instance by coupling it into the transformer 22 of the AC current source 21.

Additionally or alternatively, the current source 17 may comprise an alternating current source 21 powered by an external power source, for instance a power grid. Also, the direct current source 20 may be powered from an external power source, so that the current created by the DC power source 20 is independent from the operation of the wind turbine 1.

The current source 17 provides an open loop voltage, which is above a breakdown voltage of the isolation film, which appears at the brushes 12, 13 and/or the contact member 14, when the sliding contacts are not energized by a current. This enables to remove an isolation film by providing a current with the current source 17 to the sliding contact.

The electric circuit 11 comprises a measuring means or measuring device 23, for instance an ohmmeter, which measures the contact impedance, or contact resistance, respectively, of at least one of the sliding contacts between the brushes 12, 13 and contact member 14. The measuring means 23 is connected (connection not shown) to a control unit 24 of the electric circuit 11. By the control unit 24, the current source 17 can be controlled in dependence of the contact impedance of the at least one sliding contact between the brushes 12, 13 and the contact member 14. This allows for instance to reduce a current provided by the current source 17 if the contact resistance between the brushes 12, 13 and the contact member 14 is low, hence in a state, where no or only a neglectable isolating film between the brushes 12, 13 and the contact member 14 exists. Vice versa, in case that a larger impedance is determined by the measuring means 23, a larger current can be provided from the current source 17 removing an existing isolation film and/or preventing the formation of a new isolating film.

The brushes 12, 13 may consist at least partly of carbon and/or copper. In other words, the brushes 12, 13 may be manufactured from material that comprise carbon and/or copper. A contact member 14, which is a slip ring, in particular a break disc of a wind turbine 1, may consist or comprise for instance of steel or stainless steel. To prevent deformation of an isolating film in particular at the brushes 12, 13, a current can be provided by the current source 17 so that a current density in at least one of the brushes 12, 13 of 1 $A/cm^2$-50 $A/cm^2$, in particular of 5 $A/cm^2$-20 $A/cm^2$, is obtained. This prevents deformation of an isolating layer at the brushes 12, 13 and/or at the surface of the contact member 14.

In FIG. 3, a second embodiment of an electric circuit 11 is shown. The electric circuit 11 comprises two further brushes 25, 26, which each form a sliding contact with the contact member 14. The further brushes 25, 26 are also movable relatively to the contact member 14. The brush 25 runs on the contact member at least partly on a mutual path with the brush 12, and the brush 26 runs on the contact member at least partly on a mutual path with the brush 13. By the bias current provided by the current source 17, all sliding contacts between the brushes 12, 13 and the further brushes 25, 26 and the contact member 14 can kept in a state without or essentially without isolating film and therefore with reduced contact impedance.

The current source 17 may be provided correspondingly to the first embodiment. The measuring means 23 may measure the contact resistance of one or more of the sliding contacts between the brushes 12, 13 and/or the further brushes 25, 26 and the contact member 14 and control the current source 17 as described with regard to the first embodiment. It is possible that the brush 13 is also connected to a ground potential correspondingly to the first embodiment.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An electric circuit providing a ground connection, comprising at least two brushes and a contact member, wherein each brush and the contact member form a sliding contact, wherein the contact member is at least partly electrically conductive and electrically connects the sliding contacts of the brushes, wherein the contact member is connected to a ground potential by at least one of the sliding contacts, wherein at least two of the sliding contacts are connected to a current source adapted to provide a current through the sliding contacts.

2. The electric circuit according to claim 1, wherein the current source is adapted to provide a voltage at each brush that is equal to or larger than a breakdown voltage of an isolation film arising at the sliding contact in a state without current.

3. The electric circuit according to claim 1, wherein the electric circuit comprises a measuring means for measuring a contact impedance of at least one of the sliding contacts, wherein the current source is adapted to provide a current in dependence of a measured contact impedance.

4. The electric circuit according to claim 1, wherein the at least two brushes are electrically connected by the contact member and at least one capacitor.

5. The electric circuit according to claim 1, wherein the brushes consist at least partly of carbon and/or copper, wherein the current source is adapted to provide a current density in at least one of the brushes of 1 $A/cm^2$-50 $A/cm^2$, in particular of 5 $A/cm^2$-20 $A/cm^2$.

6. The electric circuit according to claim 1, wherein the electric circuit comprises a surge protection device.

7. The electric circuit according to claim 1, wherein the ground connection comprises at least one further brush not connected to the current source, wherein at least one of the brushes of the sliding contacts connected to the current source and the at least one further brush are movable relatively to the contact member at least partly on a mutual path.

8. The wind turbine comprising the electric circuit according to claim 1.

9. The wind turbine according to claim 8, wherein the electric circuit provides a ground connection of a rotating part of a generator of the wind turbine.

10. The wind turbine according to claim 8, wherein the electric circuit provides a ground connection of a lightning conductor of the wind turbine.

11. The wind turbine according to claim 8, wherein the contact member is a break disc of a rotatable part of the wind turbine.

12. The wind turbine according to claim 8, wherein the current source is a common mode current induced by a generator of the wind turbine.

\* \* \* \* \*